(12) United States Patent
Zhao et al.

(10) Patent No.: US 7,305,124 B2
(45) Date of Patent: Dec. 4, 2007

(54) METHOD FOR ADJUSTING IMAGE ACQUISITION PARAMETERS TO OPTIMIZE OBJECT EXTRACTION

(75) Inventors: Hung-Xin Zhao, Taichung (TW); Yea-Shuan Huang, Hsinchu (TW); Chung-Mou Pengwu, Jhonghe (TW)

(73) Assignee: Industrial Technology Research Institute, Hsinchu (TW)

( * ) Notice: Subject to any disclaimer, the term of this patent is extended or adjusted under 35 U.S.C. 154(b) by 715 days.

(21) Appl. No.: 10/878,321

(22) Filed: Jun. 29, 2004

(65) Prior Publication Data

US 2005/0141762 A1 Jun. 30, 2005

(30) Foreign Application Priority Data

Dec. 29, 2003 (TW) ............................... 92137336 A

(51) Int. Cl.
*G06K 9/00* (2006.01)
(52) U.S. Cl. ...................................... 382/164; 382/162
(58) Field of Classification Search ........ 382/162–165; 358/1.9, 500, 501, 510, 523
See application file for complete search history.

(56) References Cited

U.S. PATENT DOCUMENTS

| 5,539,540 | A | * | 7/1996 | Spaulding et al. | .......... 382/167 |
| 5,940,535 | A | * | 8/1999 | Huang | ........................ 382/201 |
| 6,728,406 | B1 | * | 4/2004 | Murao | ........................ 382/165 |
| 7,251,358 | B2 | * | 7/2007 | Haikin | ........................ 382/162 |

* cited by examiner

*Primary Examiner*—Duy M. Dang
(74) *Attorney, Agent, or Firm*—Bacon & Thomas, PLLC

(57) ABSTRACT

A method for adjusting image acquisition parameters to optimize object extraction is disclosed, which is applied to an object characterized by forming a specific cluster in a color coordinate space after performing a coordinate projection, and thus the specific cluster contributes to a specific color model, such as a human skin color model. This method first locates a target object within a search window in a selected image. Then applies the specific color model to obtain the image acquisition parameter(s) according to the color distribution and features of the target object. Therefore, the image is transformed according to the adjusted image acquisition parameter(s). Consequently, a complete and clear target object can be extracted from the transformed image by applying the specific color model, and the follow-up images having the same image acquisition conditions with the aforesaid image can also be transformed according to the same image acquisition parameter(s).

15 Claims, 11 Drawing Sheets

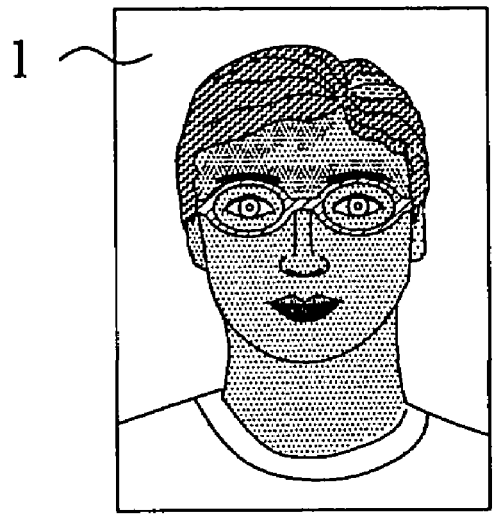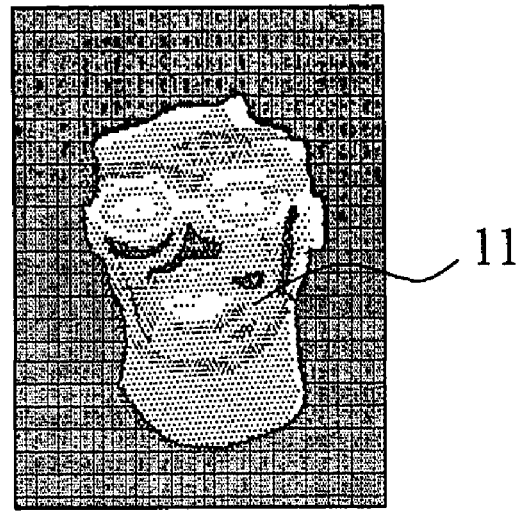
FIG. 5A  FIG. 5B
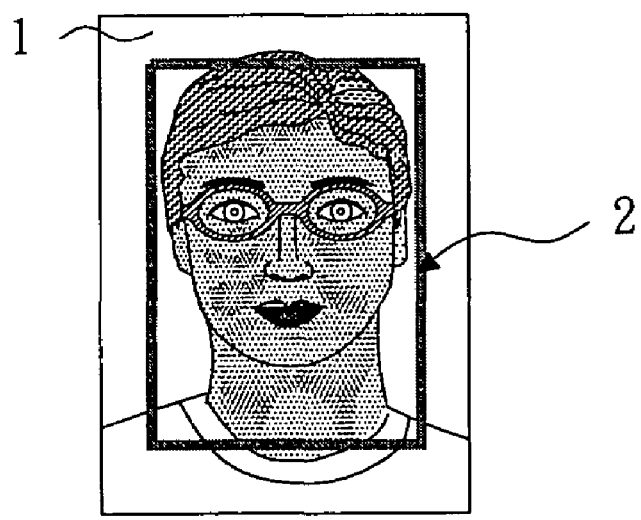
FIG. 6

METHOD FOR ADJUSTING IMAGE ACQUISITION PARAMETERS TO OPTIMIZE OBJECT EXTRACTION

BACKGROUND OF THE INVENTION

1. Field of the Invention

The present invention relates to a method for adjusting image acquisition parameters to optimize object extraction, which is suitable for different color object extraction and, more particularly, to an object characterized by forming a specific cluster in a color coordinate space after performing a coordinate projection.

2. Description of the Related Art

In a prior art technique, there are two primary image detecting methods for the human face. One is the detection of important features on the face according to the geometric positions of the eyes, nose and lips; these individual features are combined to determine a position of the face. The other method collects a plurality of facial templates, and obtains a standard facial template by way of training steps; a template matching method is then utilized to find the position of the face in the image.

However, in the first method, a predetermined facial model, or its geometric position equivalent, is used to detect the face; if the face in the image is rotated, it is very difficult to detect the correct facial position. In the second method, facial data for various different rotated angles can be provided for training a database, but the template matching method is performed by brute force on every pixel in the image, and this requires an enormous amount of time; in addition, when the image includes two differently sized human faces, the method needs to perform several upscaling or downscaling processes to find the correct positions. As shown in FIG. 1, image X includes two differently sizes human faces F1, F2. A fixed size search window Y is used for scanning every pixel in the image X and sending a selected image area to a human face verification means to determine whether the image area is a face. Since the search window Y has a fixed size, any human face that is larger or smaller than the search window Y may be ignored. Therefore, referring to FIG. 2, several upscaling or downscaling processes must be performed to obtain upscale or downscale images X1, X2, X3, and then the above-mentioned scanning and verification processes are performed to find all of the differently sized human faces F1, F2. Accordingly, the second method will consume enormous amounts of processing time.

One other prior art technique utilizes skin color to reduce the range of the template matching method to accelerate the human face detecting process. Please refer to FIG. 3A. In this prior art technique, large numbers of facial images are first manually collected; the pixels in the skin color regions, as shown in FIG. 3B, are manually extracted, and the color information of these skin color pixels are projected onto a special coordinate system to establish a skin color model for further image processing, such as facial position or feature extraction. Since an image is composed of a plurality of pixels, the color values of the pixels are determined by the light impinging upon the skin and then reflecting into a light sensing device, such as a camera. A skin color model can be established by collecting these color values of the pixels and used as a reference for determining whether further pixels are of a skin color. This prior art technique usually uses the following formula to project the RGB color information of the skin color pixels into an equivalent YCbCr color coordinate:

$$Y = 0.2989 \times R + 0.5866 \times G + 0.1145 \times B$$

$$Cb = -0.1687 \times R - 0.3312 \times G + 0.5000 \times B,$$

$$Cr = 0.5000 \times R - 0.4183 \times G - 0.0816 \times B$$

A tight space collection (skin color model Z1), as shown in FIG. 3C, can be represented by the following math formula:

$$\text{if}(Y > 128) \begin{cases} \theta_1 = -2 + \frac{256-Y}{16}; \\ \theta_2 = 20 - \frac{256-Y}{16}; \\ \theta_3 = 6; \theta_4 = -8: \end{cases}$$

$$\text{if}(Y \leq 128) \begin{cases} \theta_1 = 6; \theta_2 = 12; \\ \theta_3 = 2 + \frac{Y}{32}; \theta_4 = -16 + \frac{Y}{16}; \end{cases}$$

$$C_r \geq -2(C_b + 24); \quad C_r \geq -(C_b + 17);$$

$$C_r \geq -4(C_b + 32); \quad C_r \geq 2.5(C_b + \theta_1);$$

$$C_r \geq \theta_3; \quad C_r \geq 0.5(\theta_4 - C_b);$$

$$C_r \leq \frac{220 - C_b}{6}; \quad C_r \leq \frac{4}{3}(\theta_2 - C_b);$$

Accordingly, any pixel projected into a YCbCr coordinate Z is checked to see if it matches the above mathematical formula to determined whether the pixel is in the skin color model and whether it is a skin color pixel; in this manner it is possible to outline a skin color area of this image.

By using the skin color information, it is possible to reduce multiple exhaustive search times, and so the search window needs only to verify the skin color to find a face to accelerate processing efficiency. However, under different lighting conditions and different camera settings, the extracted images may have certain color differences, and the actual skin color value of these images may not match the skin color model based on other conditions or parameters. Therefore, a collection formed by skin color values in a color space will change according to the conditions and parameter settings. Consequently, when the conditions have errors, the determined skin color may be incorrect, which causes broken skin color areas, or added noise in background.

In prior art skin color techniques, such as U.S. Pat. No. 4,987,482, U.S. Pat. No. 6,169,536 and U.S. Pat. No. 6,249,317, image signals are all assumed to mainly include people as objects, and hardware parameters are controlled, or compensation signals are added, by detecting skin color components in the image signal to obtain a better image quality. The skin color detecting techniques utilized by these three patents all separate the image signal into brightness (Y) and color components (R-Y and B-Y), and then use predetermined phase, area or special axis to distinguish skin color and non-skin color signals. However, even though the above-mentioned patents predefine the determination rules for skin color, different cameras, different lighting conditions, and different software and hardware parameters may still affect the image. When the skin color detecting process fails, subsequent processes, such as the adding of compensation signals or the controlling of hardware parameters, will fail as well.

Therefore, it is desirable to provide a method for adjusting image acquisition parameters to optimize object extraction to mitigate and/or obviate the aforementioned problems.

SUMMARY OF THE INVENTION

A main objective of the present invention is to provide a method for adjusting image acquisition parameters to optimize object extraction, which can automatically adjust image acquisition parameter(s) of an image device based on a characteristic of forming a specific cluster in a color coordinate space after performing a coordinate projection, so that the image device can extract a complete object for different cameras, different lighting conditions, and different software and hardware parameters without requiring predetermined rules.

Another objective of the present invention is to provide a method for adjusting image acquisition parameters to optimize object extraction, which obtains a ratio for adjusting an image according to an ideal color value to obtain a complete object from the adjusted image by utilizing a skin color model.

Another objective of the present invention is to provide a method for adjusting image acquisition parameters to optimize object extraction, which selects an image acquisition parameter set giving the object a maximum color difference, and then automatically adjusting the parameters of the image extraction device accordingly.

In order to achieve the above-mentioned objective, the method for adjusting image acquisition parameters to optimize object extraction of the present invention includes: extracting an image, the image comprising at least one target object characterized by forming a specific cluster in a color coordinate space after performing a coordinate projection, and thus the specific cluster contributes to a specific color model; locating the target object in the image by a human face detection method or a manual selecting method; applying the specific color model to obtain an image acquisition parameter according to color distribution features of the target object; transforming the image according to the adjusted image acquisition parameter so the color of the transformed target object matches the specific color model; and extracting the target object from the transformed image by applying the specific color model.

Further, the present invention can be applied in an offline status, image acquisition parameters are calculated based upon a von Kries color adaptation model, so the transformed object color corresponding to the target object matches the specific color model better. Furthermore, the present invention can be applied in an online status, optimized image acquisition parameters can be obtained for the image capturing device, so color distribution of the target object is in the specific color model better. The above-mentioned color can be human facial skin color or any other color capable of forming a specific cluster in a color coordinate space.

Other objects, advantages, and novel features of the invention will become apparent from the following detailed description, when taken in conjunction with the accompanying drawings.

BRIEF DESCRIPTION OF THE DRAWINGS

FIG. 5A shows an image having facial skin color according to the present invention;

FIG. 5B shows a skin color area corresponding to the image shown in FIG. 5A;

FIG. 6 shows a search window of the embodiment according to the present invention;

DETAILED DESCRIPTION OF THE PREFERRED EMBODIMENT

Two embodiments are described in the following description.

The method for adjusting image acquisition parameters to optimize object extraction in the present invention can filter effects caused by different acquisition environments, different lighting conditions, or different image extraction device parameters, and extracts a complete object area which can be used to perform further image processing procedures, such as detection, tracking, positioning, or recognition upon the image. The present invention can be preformed on both offline image data and online captured images. The offline image can be selected from well known JPEG, GIF or MPEG image files, and the image acquisition parameters are calculated according to this image and used to adjust other images obtained from the same acquisition environment (such as the same lighting conditions or background) to extract an optimized object image. The online capturing image device uses one image to calculate the image acquisition parameters, and then accordingly adjusts its parameter settings.

The extracted object in the present invention has the characteristic of forming a specific cluster in a color coordinate space (such as an RGB coordinate space, an HSV coordinate space, a YCbCr coordinate space, etc. . . . ) after performing the appropriate coordinate projection. For example, when an RGB color component corresponding to the skin color of different facial types is projected into a YCbCr coordinate space, a specific cluster will be formed. In the following first and second embodiments, a skin color model (i.e. a specific color model) established by a specific cluster formed by facial skin colors (i.e. the object color) being projected into the YCbCr coordinate space is used as a reference for extracting a target color (i.e. target object) in the image. Therefore, after a skin color area is extracted, any related subsequent facial image processing procedures will have higher recognition efficiencies. Any object that has this characteristic is suitable for the present invention.

Figure 1:
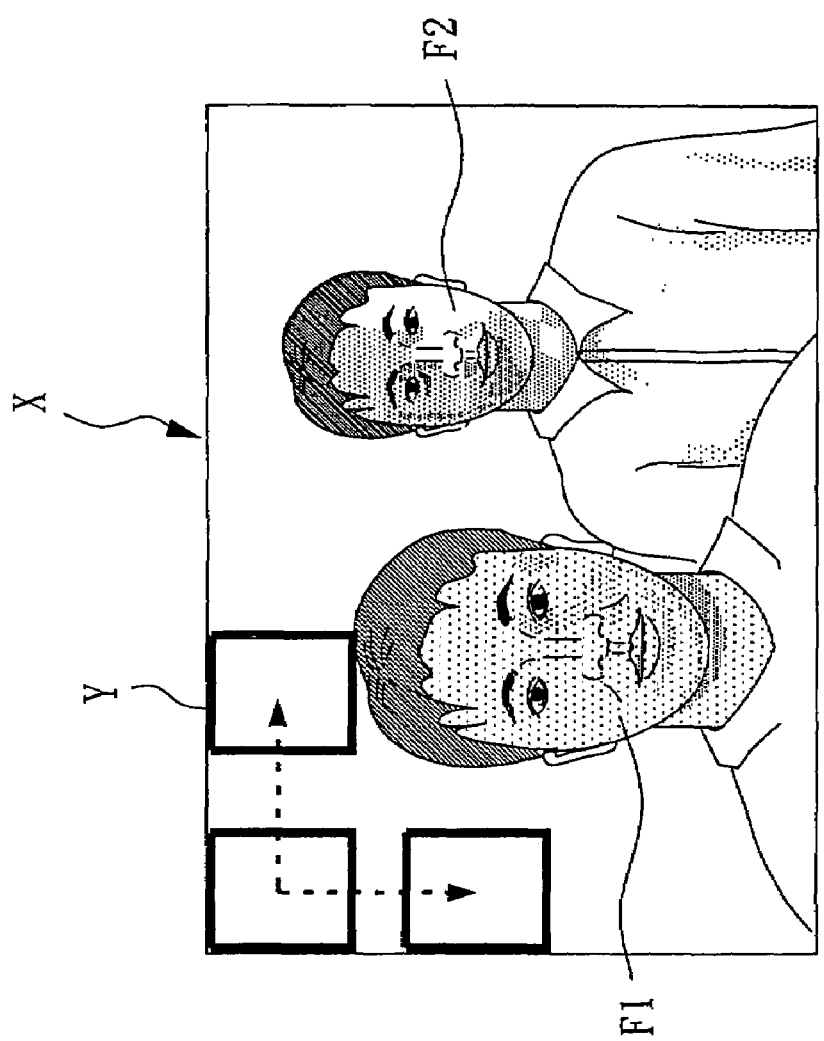
FIG. 1 is a state schematic drawing of a prior art technique utilizing a search window to search for a human face in an image.
Figure 2:
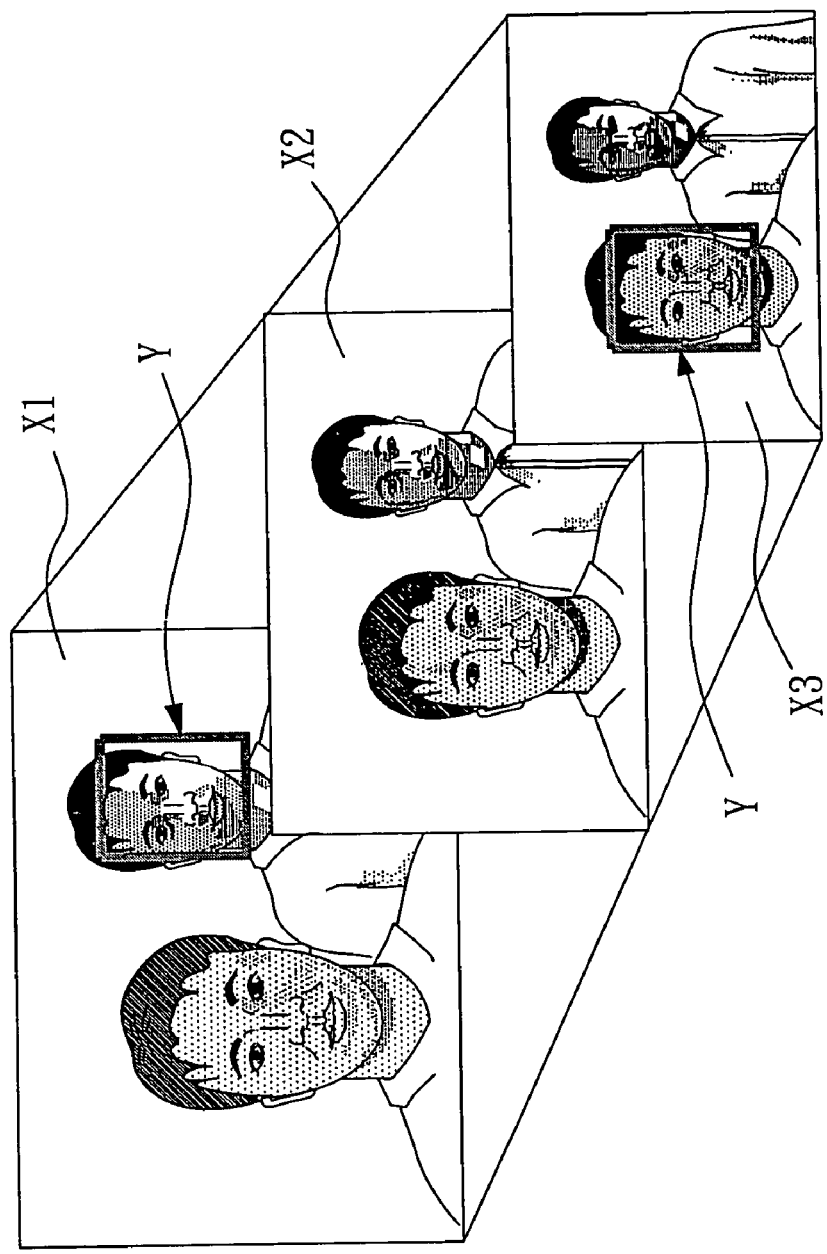
FIG. 2 is a state schematic drawing of a prior art technique providing an upscaling process to the search window to search for a face in an image.
Figure 3A:
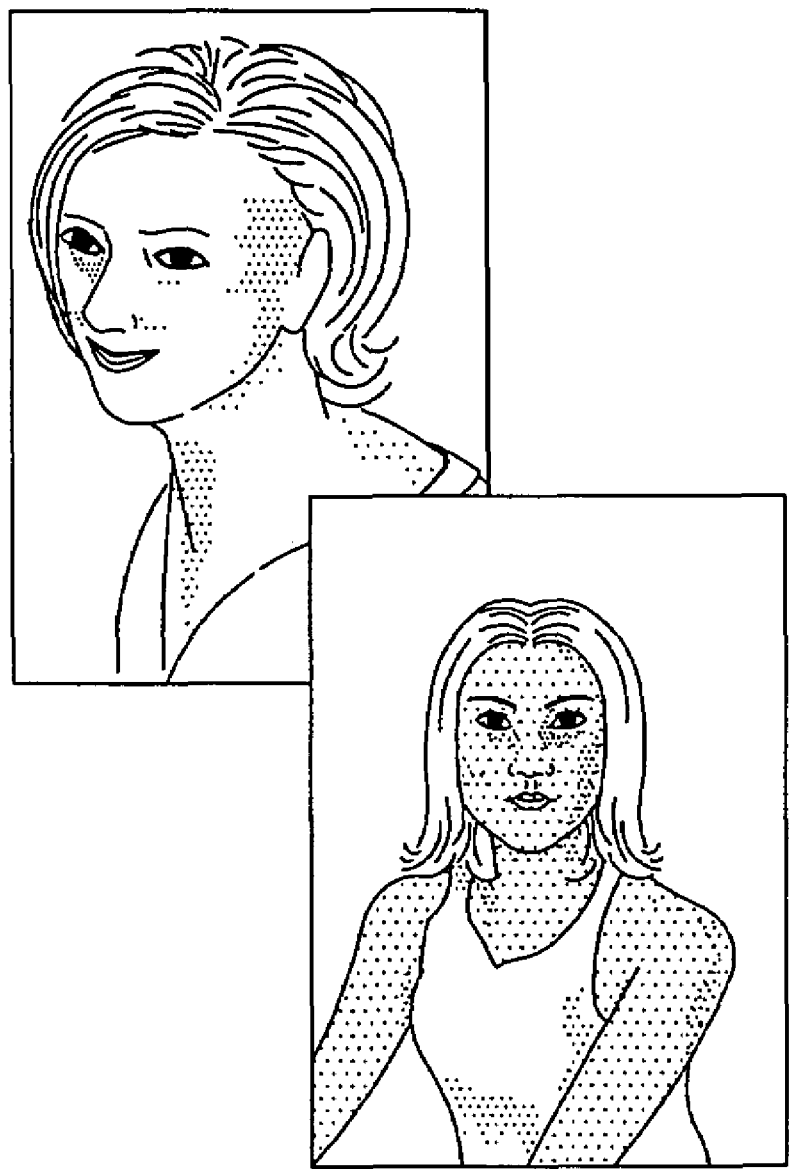
FIG. 3A is a schematic drawing of an image of a face according to a prior art.
Figure 3B:
FIG. 3B is a skin color area schematic drawing of the facial image shown in FIG. 3A according to the prior art.
Figure 3C:
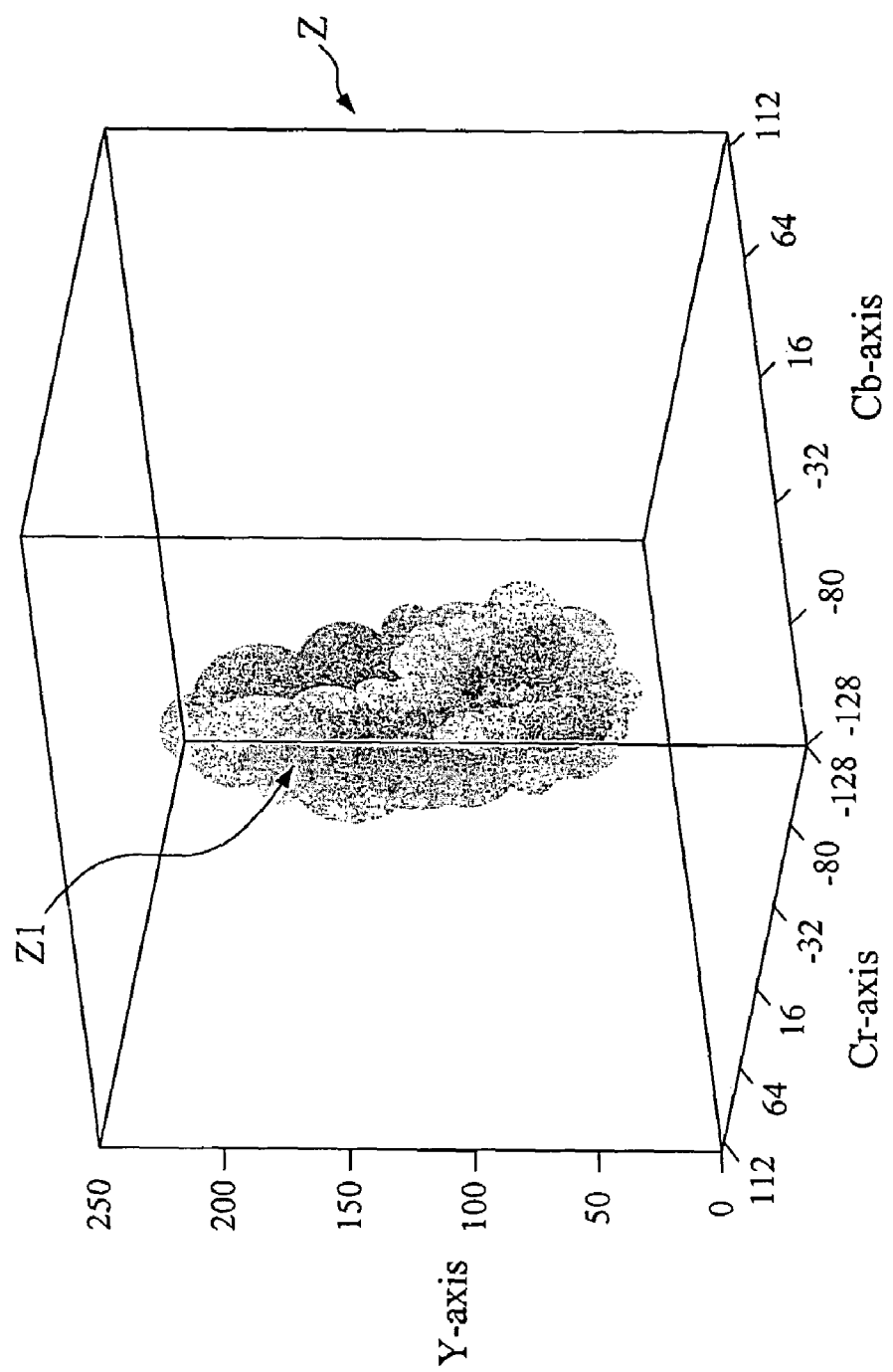
FIG. 3C is a schematic drawing of a skin color model based on FIG. 3A according to the prior art.
Figure 4:
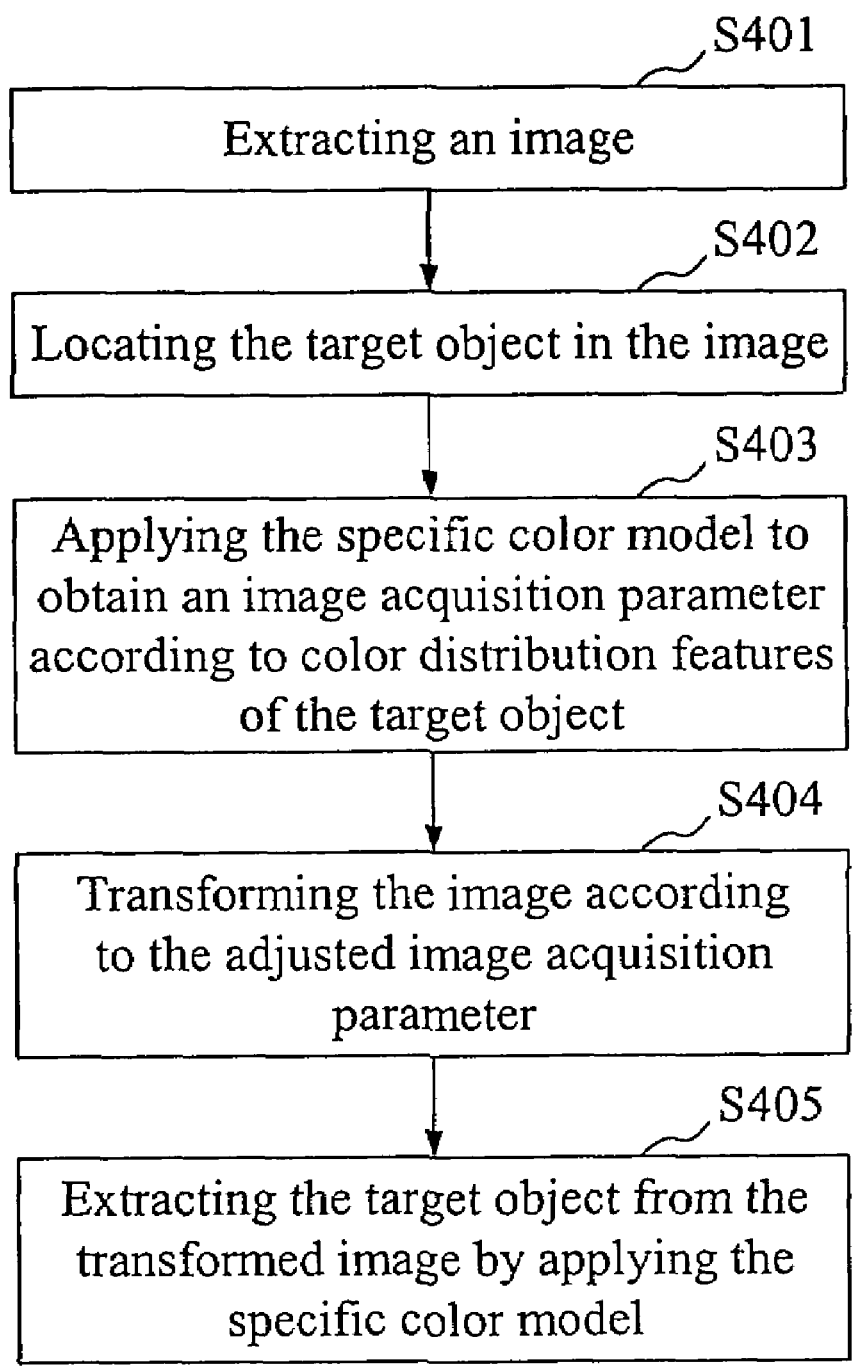
FIG. 4 is a flow chart of an embodiment being performed in an offline status according to the present invention.

First Embodiment (Calculating the Image Acquisition Parameters in an Offline Status):

Please refer to FIG. 4 and FIG. 5A. FIG. 4 is a flow chart of an embodiment being performed in an offline status according to the present invention. FIG. 5A shows an image having facial skin colors according to the present invention. In this embodiment, an image 1 including human facial skin colors, as shown in FIG. 5A, is extracted (step 401), which is an existing image from an offline source, such as film or monitor video; this offline data includes hardware settings of the image capturing device that cannot be changed. According to a skin color model established from large amounts of skin color information, a skin color area 11 as shown in FIG. 5B is extracted from the image 1, which is broken and has some background noise. Therefore, the skin color area 11 in the image 1 is not represented completely, which is not ideal for subsequent facial detection, positioning or tracking image processing procedures.

In order to increase the extraction efficiency for objects, a position of the face in the image 1 is located (step 402), as shown in FIG. 6. In this embodiment, a search window 2 is used for locating a facial area in the image 1, which utilizes an automatic facial detection method, or a manual selection method. Furthermore, image acquisition parameters are calculated based upon a von Kries color adaptation model (step 403); the formula for the von Kries color adaptation model is:

$$L(\lambda) = E(\lambda)R(\lambda),$$

wherein $R(\lambda)$ is a reflecting panel, $E(\lambda)$ is an incident light projected onto the reflecting panel, $L(\lambda)$ is a reflected light from the reflecting panel, and $\lambda$ is a wave length of the light. Accordingly, a excitation value of the reflected light is determined by the characteristics of the incident light and the reflected panel, and the three original R, G, B color components of $L(\lambda)$, $E(\lambda)$, and $R(\lambda)$ are $L_R(\lambda)L_G(\lambda)L_B(\lambda)$, $E_R(\lambda)E_G(\lambda)E_B(\lambda)$, and $R_R(\lambda)R_G(\lambda)R_B(\lambda)$. Since in this embodiment all reflecting characteristics of the face are all the same, which also indicates $R(\lambda)$ has a fixed value, the following relationship rule can be obtained according to the von Kries color adaptation model:

$$\begin{cases} L_1(\lambda) = E_1(\lambda)R(\lambda) \\ L_2(\lambda) = E_2(\lambda)R(\lambda) \end{cases},$$

and furthermore:

$$\frac{L_1(\lambda)}{L_2(\lambda)} = \frac{E_1(\lambda)}{E_2(\lambda)},$$

wherein $L_1(\lambda)$ is an ideal color value, $L_2(\lambda)$ is an object color value corresponding to the target object, $E_1(\lambda)$ is a background light source when the ideal color value $L_1(\lambda)$ is detected, and $E_2(\lambda)$ is background light source when the object color value $L_2(\lambda)$ is detected.

Figure 7:
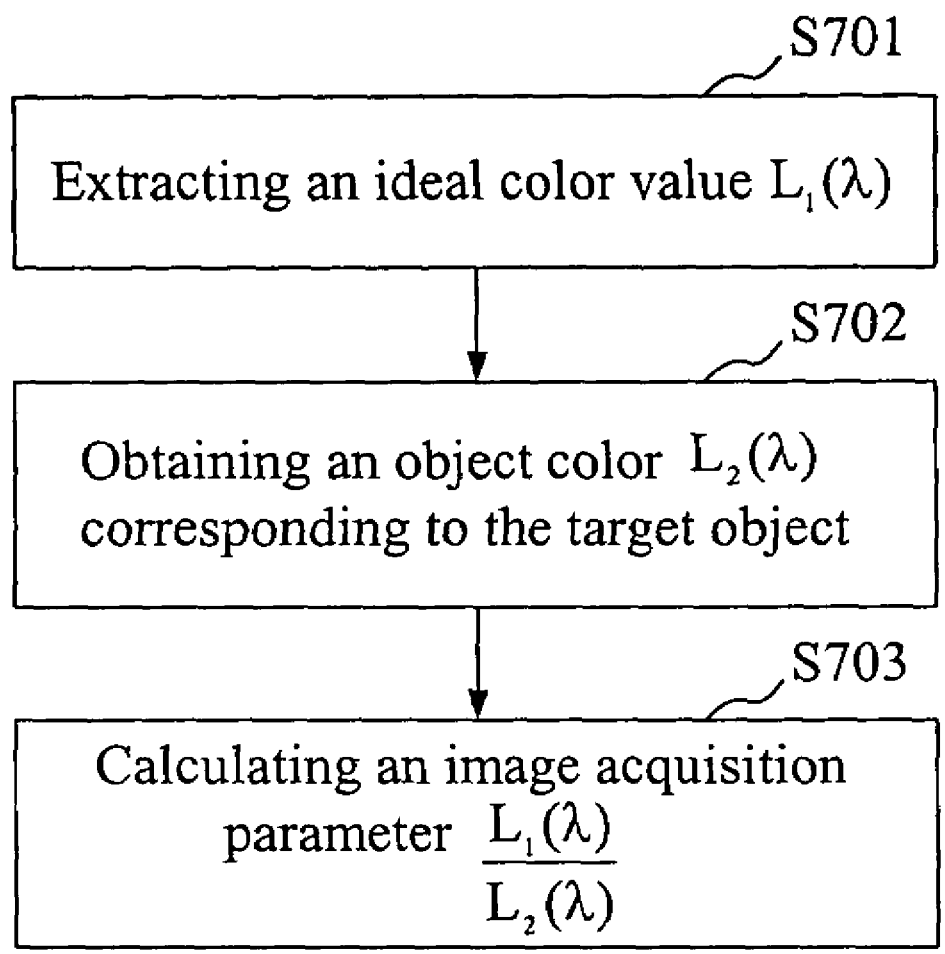
FIG. 7 is a detailed operational flow chart of step S403 shown in FIG. 4.

According to the above relationships, please refer to FIG. 7 with FIG. 4, which shows a detailed operational flow chart of step 403 shown in FIG. 4. Firstly, the ideal color value $L_1(\lambda)$ is extracted (step 701); in this embodiment, a center point of the skin color model distributed in the color coordinate is directly used as the ideal color value $L_1(\lambda)$. Next, based on a color histogram corresponding to the facial area located by the search window 2, an actual object color value $L_2(\lambda)$ corresponding to the skin color components in the search window 2 is extracted (step 702); since it is in a facial area, the smooth skin color utilizes more brighter color components, providing color components with higher grey values, or the brightest first 80% (depending on actual conditions, or being selected manually) of the color components in the color histogram corresponding to this facial area, which are extracted and the three average values $R_m$, $G_m$, $B_m$ of the three original colors are obtained to indicate an actual skin color value $L_2(\lambda)$ before adjusting the image acquisition parameters. By using the ratio $$\frac{L_1(\lambda)}{L_2(\lambda)} = \frac{E_1(\lambda)}{E_2(\lambda)},$$

an image acquisition parameter is obtained as $$\frac{L_1(\lambda)}{L_2(\lambda)}$$

(step 703).

Figure 8A:
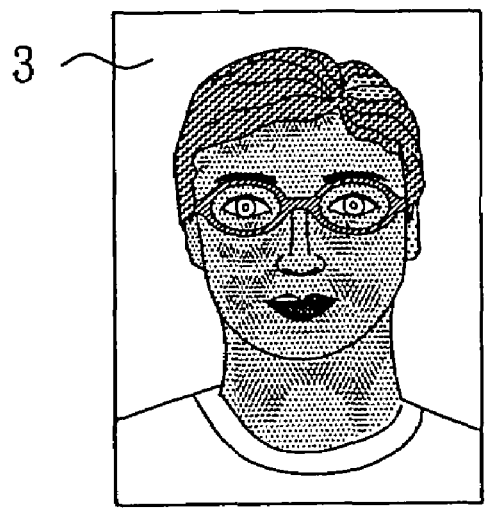
FIG. 8A is a schematic drawing of a transformed image according to the present invention.
Figure 8B:
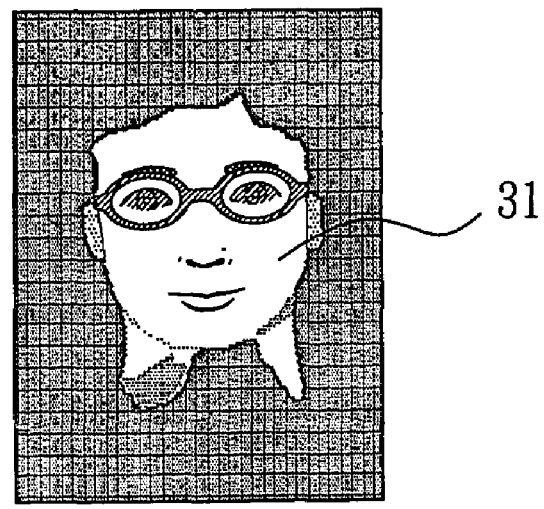
FIG. 8B shows a transformed skin color area corresponding to the transformed image shown in FIG. 8A.

Please refer again to FIG. 4; after the skin color values $L_2(\lambda)$ of all pixels in the image 1 are multiplied by the image acquisition parameter $$\frac{L_1(\lambda)}{L_2(\lambda)},$$

a transformed image 3 as shown in FIG. 8A is obtained (step 404) to emphasize skin color characteristics and to remove background noise. Moreover, a transformed skin color area 31 in the transformed image 3 as shown in FIG. 8B can be extracted by a calculation of the skin color model (step 405), which is much more clear and complete than the skin color area 11 shown in FIG. 5B. Therefore, a range covered by this optimized transformed skin color area 31 can accelerate subsequent image processing procedures, and clearly reduces a probability of detecting incorrect facial areas.

The image 1 in FIG. 5A is one image from a series of continuous video images, and so after multiplying the acquisition parameters $$\frac{L_1(\lambda)}{L_2(\lambda)}$$

all other images having the same acquisition environment as the image 1 will have the same skin color effect, and all can provide a clear and complete skin color area after being determined by the skin color model.

In addition, although this embodiment is used for obtaining the image acquisition parameters in an offline status, the image acquisition parameters $$\frac{L_1(\lambda)}{L_2(\lambda)}$$

can still be used for the image captured by an online camera.

Figure 9:
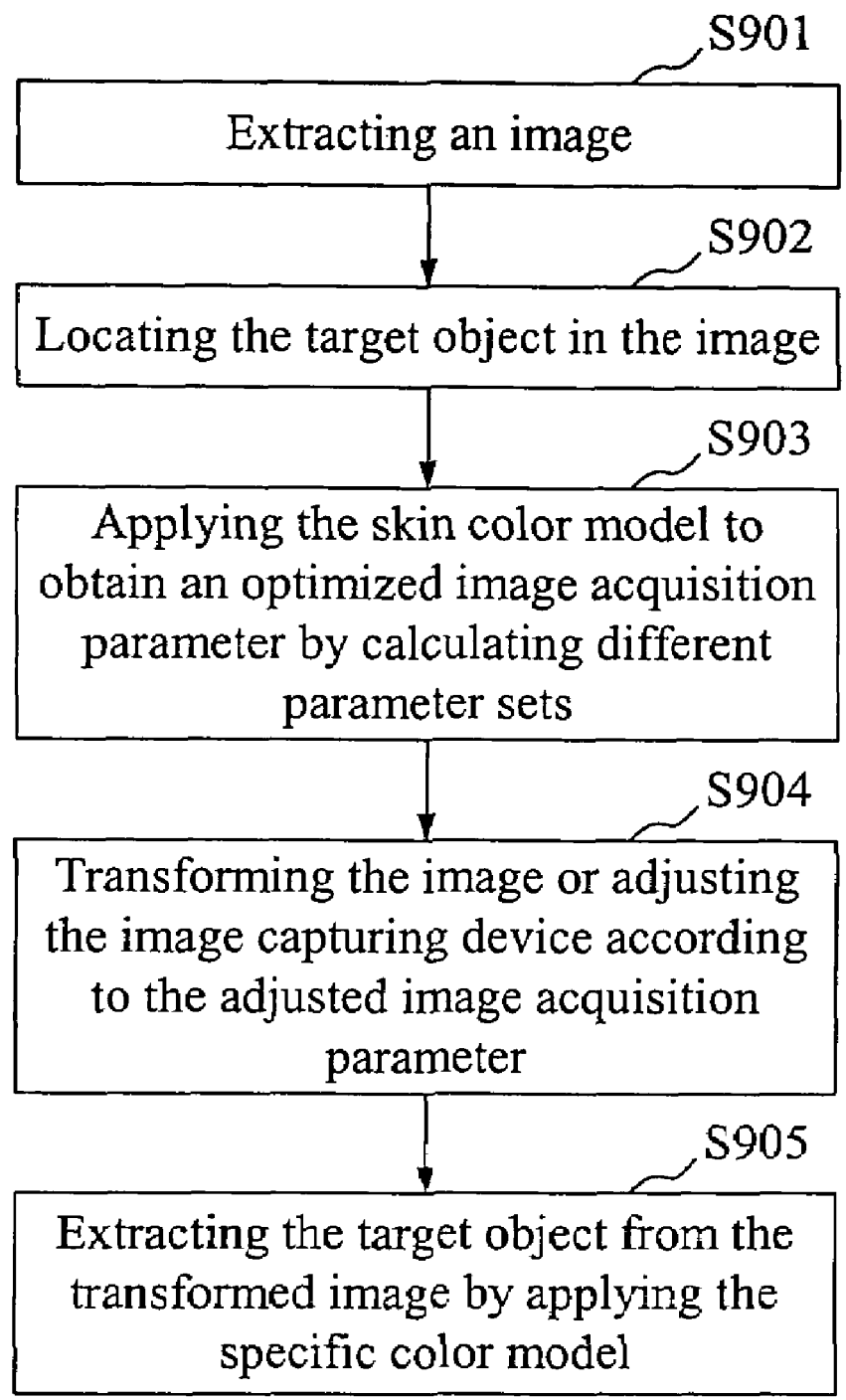
FIG. 9 is a flow chart of another embodiment being performed in an online status according to the present invention.

Second Embodiment (Calculating the Image Acquisition Parameters in an Online Status):

Please refer to FIG. 9. FIG. 9 is a flow chart of another embodiment being performed in online status according to the present invention. In this embodiment, the image 1 shown in FIG. 5A is used as an online image. The image 1 is sent from an operating image capturing device (step 901). The image capturing device can be a video camera or a still camera. Next, the search window shown in FIG. 6 is also used for locating the facial area in the image 1 (step 902).

Figure 10:
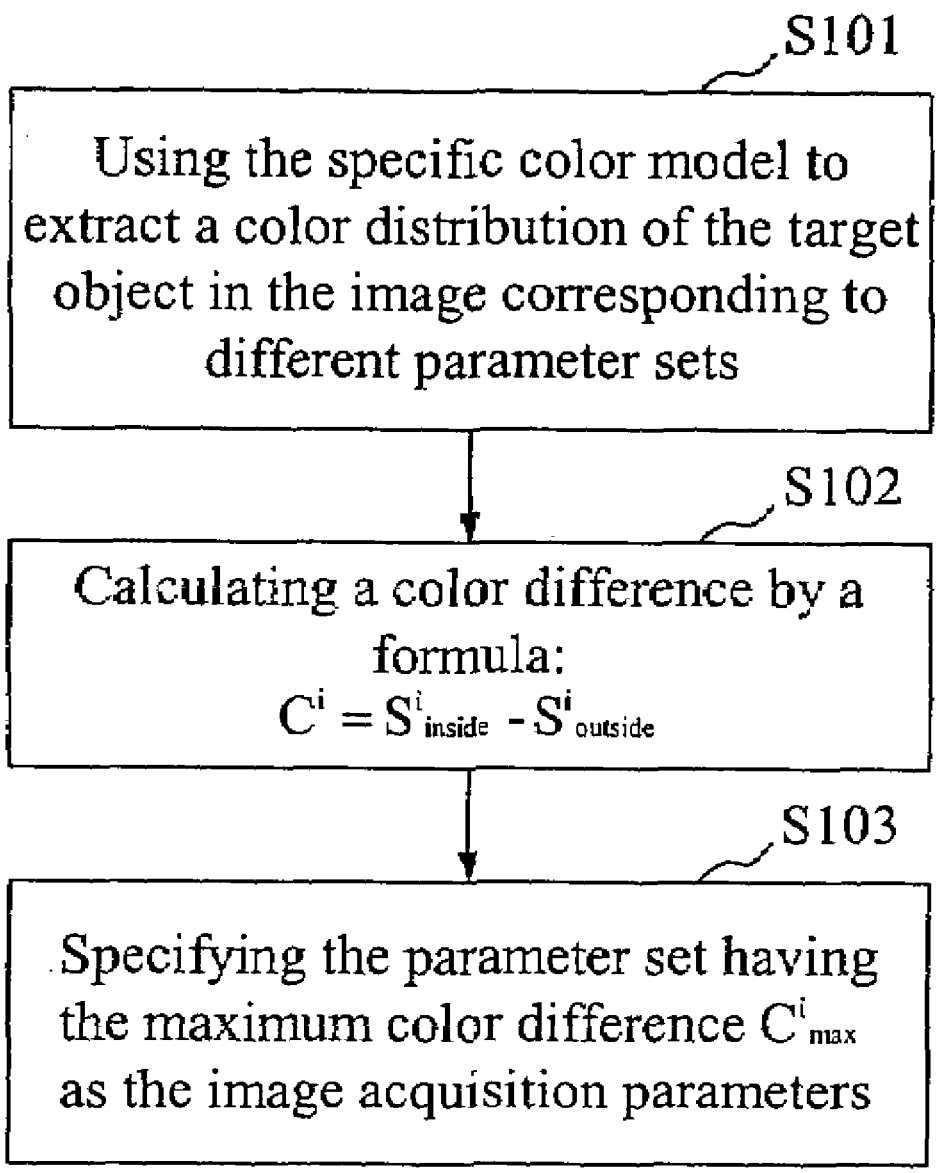
FIG. 10 is a detailed operational flow chart of step S903 shown in FIG. 9.

Please refer to FIG. 10. FIG. 10 is a detailed operational flow chart of step 903 shown in FIG. 9. In step 903, a skin color distribution of the image 1 is extracted, and then the skin color model is used for calculating different parameter sets to find a flowchart for optimized image acquisition parameters. In this embodiment, the skin color model is used for extracting the skin color distribution corresponding to different parameter sets $\kappa^i$ in the image 1 (step 101), wherein the parameter sets can be RGB gain values $\kappa_{Gr}^i$, $\kappa_{Gg}^i$, $\kappa_{Gb}^i$, or even combinations of exposure values or brightness parameters. Furthermore, all possible parameter sets $\kappa^i$ are input into a formula: $C^i = S^i_{inside} - S^i_{outside}$ to obtain their color differences (step 102); wherein, $S^i_{inside}$ is a total number of pixel in the search window 2 and matching the skin color model, and $S^i_{outside}$ is a total number of pixels outside the search window 2 and matching the skin color model $S^i_{inside}$. Accordingly, the parameter set having the maximum color difference $C^i_{max}$ is the image acquisition parameters for this embodiment (step 103). Therefore, the image capturing device can be adjusted according to the image acquisition parameters to obtain the transformed image 3 matching the skin color model as shown in FIG. 8A (step 104), and then a transformed skin color area 31 in the transformed image 3 as shown in FIG. 8B can be extracted by calculation with the skin color model (step 105).

Certainly, the image capturing device will be adjusted according to the image acquisition parameters, and so a more clear and complete skin color area can be extracted from all further dynamic images by utilizing the skin color model.

According to the above-mentioned description, the present invention can also be applied to other objects with different colors, as long as the object has the characteristic of forming a specific cluster in a color coordinate space after performing a coordinate projection; the image device can extract a complete object under different camera settings, different lighting conditions and different software and hardware parameters. The present invention can automatically adjust the image capturing device according to the image acquisition parameters without requiring manual adjustment. After undergoing processing by the method of the present invention, the image can provide better objects for subsequent image processing procedures.

Although the present invention has been explained in relation to its preferred embodiment, it is to be understood that many other possible modifications and variations can be made without departing from the spirit and scope of the invention as hereinafter claimed.

What is claimed is:

1. A method for adjusting image acquisition parameters to optimize object extraction, comprising:
    an image extracting step, for extracting an image, the image having at least one target object characterized by forming a specific cluster in a color coordinate space after performing a coordinate projection, and thus the specific cluster contributing to a specific color model;
    a locating step, for locating the target object in the image;
    an image acquisition parameter calculating step, for applying the specific color model to obtain an image acquisition parameter according to color distribution features of the target object;
    an image transforming step, for transforming the image according to the adjusted image acquisition parameter so the color of the transformed target object matches the specific color model; and
    an object extracting step, for extracting the target object from the transformed image by applying the specific color model.

2. The method as claimed in claim 1, wherein in the image extracting step, the image is one of a plurality of continuous video images.

3. The method as claimed in claim 2, wherein in the image transforming step, the image acquisition parameter is used for transforming all the images from the plurality of continuous video images, and the target object is extracted from the plurality of transformed images.

4. The method as claimed in claim 1, wherein in the locating step, a search window containing the target object is selected to locate the target object in the image.

5. The method as claimed in claim 4, wherein the image acquisition parameter is obtained according to a von Kries color adaptation model $L(\lambda) = E(\lambda)R(\lambda)$, where $R(\lambda)$ is a reflecting panel, $E(\lambda)$ is an incident light projected onto the reflecting panel, $L(\lambda)$ is a reflected light from the reflecting panel, and $\lambda$ is a wave length of the light.

6. The method as claimed in claim 5, wherein the image acquisition parameter calculating step further comprises the sub-steps of:
    (A1) extracting an ideal color value $L_1(\lambda)$;
    (A2) extracting a color component of the target object according to a color histogram of an image area containing the target object to obtain an object color $L_2(\lambda)$ corresponding to the target object; and
    (A3) calculating an image acquisition parameter $$\frac{L_1(\lambda)}{L_2(\lambda)}$$

according to a von Kries color adaptation model $$\begin{cases} L_1(\lambda) = E_1(\lambda)R(\lambda) \\ L_2(\lambda) = E_2(\lambda)R(\lambda) \end{cases};$$

wherein $E_1(\lambda)$ is a background light source when the ideal color value is detected, $E_2(\lambda)$ is background light source when the target object is detected, and $R(\lambda)$ is a reflecting characteristic of the target object with the light source.

7. The method as claimed in claim 6, wherein the image transforming step is performed by causing every pixel in the image to be multiplied by the acquisition parameter to obtain the transformed image.

8. The method as claimed in claim 6, wherein the ideal color value is a center point of the specific color model.

9. The method as claimed in claim 4, wherein an image capturing device is used for continuously extracting dynamic images of the target object.

10. The method as claimed in claim 9, wherein the image acquisition parameter calculating step further comprises the sub-steps of:
(B1) using the specific color model to extract a color distribution of the target object in the image corresponding to different parameter sets;
(B2) calculating a color difference by a formula: $C^i = S^i_{inside} - S^i_{outside}$, wherein $S^i_{inside}$ is a total number of pixels in the image area and matching the specific color model, and $S^i_{outside}$ is a total number of pixels outside the image area and matching the specific color model; and
(B3) extracting a parameter set corresponding to a maximum color difference $C^i_{max}$ to specify the image acquisition parameter.

11. The method as claimed in claim 10, wherein the image capturing device directly extracts the transformed image according to the image acquisition parameter.

12. The method as claimed in claim 10, wherein in step (B1), the parameter set is an RGB gain value of the image.

13. The method as claimed in claim 1, wherein the color of the object is a human skin color, and the specific color model is a skin color model.

14. The method as claimed in claim 1, wherein the color coordinate space is an RGB coordinate space.

15. The method as claimed in claim 1, wherein the color coordinate space is an YCbCr coordinate space.

* * * * *